2,717,227
        COMPOSITION CONTAINING NERVE TISSUE
          EXTRACT AND PROCESS OF PRODUCING
          SUCH EXTRACT

Helen L. Dawson, Iowa City, and Max D. Wheatley,
                        Hills, Iowa No Drawing. Application December 22, 1954,
                        Serial No. 477,133

6 Claims. (Cl. 167—74)

The present invention relates to oxidized nerve tissues which may be utilized as extracts, salves or powders, to correct or heal malfunctioning or diseased animal cells, tissues or organs.

Considerable investigation has been done in the past with respect to the use of growth-promoting substances, to cure diseases of the body. Almost all body tissues have been tried at one time or another. The most extensive work, however, has been done in connection with embryonic tissues and, in fact, a product of this type is being marketed at the present time under the trade mark "Epicutan." More recently, adult sheep hearts have been extracted to provide compositions of curing diseases of animal cells, tissues and organs. All this previous work, however, was done with fresh tissues, i. e., with materials unsubjected to synthetic chemical changes.

It is reported that the previous work met with favorable results. However, the results were not so satisfactory as to justify the extensive use of the materials involved in curing malfunctioning of the body.

It is known that all tissues and organs of the body are under the control of the nervous system, and that normal functioning in the living organism is dependent upon the proper activation by the nervous system. Therefore, it was logical to assume that any destruction or disturbance of, or any unbalance in the functioning of the nervous system, would result in varying degrees of malfunctioning of the cells, tissues and organisms supplied by this system.

It, therefore, appeared to us that if the "secretion," "metabolic products," or whatever constituted the active substance of the nervous system, could be introduced into a malfunctioning or diseased organ or structure in a form in which it could be utilized by the cells of the tissue or organ, then these cells and therefore the tissues and organs formed by them would again function normally, and the "disease syndrome" would be cleared up.

We have now found that our premise is correct and that the curing, healing or correction of malfunctioning or diseased cells, tissues or organs, can be effected in a relatively short period of time, by the application thereto of oxidized nerve tissues applied either in the form of a liquid, a salve or a powder. Such compositions and their preparation, accordingly, constitute the purposes and objects of our invention.

For preparing our compositions we may utilize any nervous tissue of a mammal, such as the brain (preferably without the pituitary gland), heart, spinal cord, peripheral nerves, or the like. The nervous tissue may be derived from any mammal, such as a pig, calf, rat or cat. Thus, our work has shown no evidence that the results we obtain are specific to the mammal from which the tissues used are derived.

The tissue selected is oxidized by subjecting it to elevated temperatures in the presence of an oxidizing agent such as air, oxygen, hydrogen peroxide, potassium permanganate, potassium chromate, sodium perborate, benzoyl peroxide, peracetic acid, or the like. The temperature to which the material is heated may vary, depending upon the particular material used, but generally will range from about 100 to 300° C., the time of treatment being shorter the higher the temperature. The temperature may be supplied by conventional heating means, or by diathermy or infra red rays.

Where the oxidizing agent is air or oxygen, oxidation proceeds satisfactorily by merely providing access of these gases to the container for the material undergoing oxidation. Where a solid or liquid oxidizing agent is employed, a few percent based on the weight of the tissue treated is added thereto for producing the oxidation.

The duration of the heat treatment will, of course, vary, depending upon the quantity and type of material treated, but will usually be for several hours. The duration can readily be determined by a skilled operator.

If the composition is desired in the form of a liquid, the nervous tissue, after oxidation, is extracted with a water soluble substance compatible with the human system. For this purpose, one may employ a normal saline solution, Ringer's solution, blood plasma, blood serum, Tyrode's solution, distilled water or the like.

If the oxidized tissue is to be employed as a salve, it is ground and mixed with a hydrophilic base such as kaolin, casein, or the like, to form a firm, readily applied paste. Conversely, if a dusting powder is desired, the oxidized tissue may be ground to a powder and used as such.

Our compositions may be used to treat any condition in which there is an impairment or destruction of nervous tissue resulting in disturbance or loss of the functional relationship between the nervous system and cells, tissues or organs of the body, normally supplied by it. Specifically, we have used our materials for the treatment of wounds, both clean (operational) and infected, in cats, rats and humans, and the treatment of decubitus ulcers on hospital patients.

The invention is further illustrated by the following examples, but it is to be understood that the invention is not restricted thereto. These examples deal with both the preparation and the use of our compositions.

Example I 227 grams (about ½ pound) of fresh calf's brain are placed in a sterile open-mouth container and heated in an oven at 125° C. for 4 hours. The material is then cooled to room temperature (about 20° C.). 125 cc. of a sterile normal saline solution are then added and allowed to extract the oxidized brain for 4 hours, the container being agitated at frequent intervals. The supernatant liquid, amounting to about 100 cc., is drawn off with a sterile syringe and stored in sterile bottles in a refrigerated space.

We have effectively used extracts, prepared as above, after they have been standing for as long as one month. However, to be on the safe side we recommend that the extracts be prepared at least weekly.

Example II

The procedure is the same as in Example I, excepting that hydrogen peroxide in an amount of 2% by weight of the fresh brain is added to the container prior to heating in the oven.

Example III

The procedure was the same as in Example I, excepting that oxidation was effected at a temperature of 180° C. for about 4½ hours.

Example IV

The procedure is the same as in Example I, excepting that the oxidized brain is extracted with Ringer's solution.

Example V

The oxidized brain prepared according to Example I is ground and mixed with kaolin in the relative proportions of one part of the oxidized brain to one part of kaolin, the parts being by weight. A salve is obtained which may be readily applied to the body.

Example VI

An old male cat was operated on to produce lesions in the hypothalamic area of the brain. Infection of the wound was observed two days later. Two days subsequently the wound was opened and pus was found. On this date the nerve extract, prepared as in Example I, was flushed into the wound with a syringe. Necrosis of tissue was noted five days after the operation. On the sixth day after the operation, more extract was flushed into the wound. On the following day the head wound began healing and more extract was used as above. Two days later the wound was almost healed, and on the following day the wound healed completely.

The time of treatment amounted to only 6 days and the number of dosages used amounted to three. The quantity of the extract employed was that sufficient to completely flush out the wound in each case.

Example VII

A 40-year old female patient was afflicted by a chronic ulcer of 3-months duration which resulted from a burn the patient had received while using a heating pad. The ulcer was located over the left greater trochanter. It had 1 by 6 cm. area of open ulcer with 1 cm. border of unsatisfactory scar tissue therearound. The ulcer had failed to respond to usual treatments.

Nerve extract prepared according to Example I was used on the ulcer on February 28, 1950. It was applied by pouring the extract into the ulcer and placing over the ulcer, dressings soaked in the extract. These dressings were changed twice daily. On March 1st the wound looked improved, the edges being mobile. On March 3rd it still showed a marked discharge, but the wound was smaller in size. On March 27th the wound began filling in slowly. On April 4th the wound was completely filled in with granulation tissue. There is a minimal attempt at epithelization.

Example VIII

A patient with an old X-ray burn on the dorsum of the right hand had been given every available treatment but with no improvement. The patient suffered such severe pain that amputation of the hand was in contemplation. At this point, resort was had to the use of our composition.

Sponges saturated with the extract of Example I were applied to the proximal lesion 4 times each day. At the end of five days the wound showed definite improvement in that there was less necrotic exudate and a greater amount of granulation tissue in the base of the ulcer.

This treatment was continued for a further week, when the patient reported that he had spent the most comfortable period since he had contracted the burn. The wound on investigation at this time showed an increase of at least 100% in evidence of granulation tissue and a decrease in the size of the ulcer of at least 10%. There was a little excoriation of skin just proximal to the ulcer, which was treated with zinc oxide.

The treatment was continued for a further period of 9 days during which time the patient required no sedatives. The ulcerated area at the end of this time was slowly but definitely decreasing in size, so that it was no more than 50% of the area than it had been 3 weeks previously. There was also more granulation tissue than at any previous time and the little sloughy tissue that remained was thinner and covered a smaller area. This is the result to date and the treatment is still being continued.

The results of this example would appear to hold out promise that our compositions may be effective for the treatment of atomic burns.

This application is a continuation-in-part of our application Serial No. 186,689, now abandoned, filed September 25, 1950, entitled, "Nervous Tissue Extracts and Salves."

Various modifications of our invention will occur to persons skilled in the art and we, therefore, do not intend to be limited in the patent granted except as necessitated by the prior art and the appended claims.

We claim:

1. The process of producing an extract for curing or healing malfunctioning or diseased animal cells, tissues or organs which comprises heating to a temperature of the order of 100 to 300° C. a mammalian tissue consisting essentially of nerve tissue in the presence of an oxidizing agent to oxidize said tissue and extracting the oxidized material with a water soluble solvent compatible with the human body.

2. The process as defined in claim 1, wherein the mammalian tissue is the brain of a mammal and the temperature of heating is about 185° C.

3. The process as defined in claim 1, wherein the tissue is the brain of a mammal and the heating is effected with free access of oxygen.

4. The process as defined in claim 1, wherein the oxidizing agent is hydrogen peroxide.

5. The process as defined in claim 1, wherein the water soluble solvent is Ringer's solution.

6. A composition for curing or healing malfunctioning or diseased animal cells, tissues or organs containing, as its effective ingredient, oxidized nerve tissue of a mammal prepared according to the process of claim 1.

References Cited in the file of this patent

UNITED STATES PATENTS

| | | |
|---|---|---|
| 2,162,863 | Ripke | June 20, 1939 |
| 2,239,345 | Sperti | Apr. 22, 1941 |

FOREIGN PATENTS

| | | |
|---|---|---|
| 349,257 | Great Britain | May 28, 1931 |
| 414,685 | Great Britain | Aug. 8, 1934 |
| 534,454 | Great Britain | Mar. 7, 1941 |

OTHER REFERENCES

Ser. No. 368,731, Fisher (A. P. C.), published May 11, 1943.